United States Patent [19]

Suzuki

[11] 4,410,936
[45] Oct. 18, 1983

[54] POWER CONVERTER

[75] Inventor: Yoshikazu Suzuki, Tokyo, Japan

[73] Assignee: Oki Electric Industry Co., Ltd., Tokyo, Japan

[21] Appl. No.: 340,373

[22] Filed: Jan. 18, 1982

[30] Foreign Application Priority Data

Jan. 24, 1981 [JP] Japan .................................. 56-9220

[51] Int. Cl.³ .......................................... H02P 13/00
[52] U.S. Cl. ........................................ 363/80; 363/21; 363/97
[58] Field of Search ..................... 363/19, 20, 21, 80, 363/97; 331/112

[56] References Cited

U.S. PATENT DOCUMENTS

| 2,922,032 | 1/1960 | Haas et al. ........................ | 331/112 X |
| 3,989,995 | 11/1976 | Peterson ........................... | 331/112 X |
| 4,187,536 | 2/1980 | Govaert et al. ..................... | 363/21 |
| 4,328,537 | 5/1982 | Schmidtner et al. ................. | 363/21 |

Primary Examiner—William M. Shoop
Attorney, Agent, or Firm—Ratner & Prestia

[57] ABSTRACT

A switching power converter with high conversion efficiency has been found. The converter has a DC power source (1), a switching element (2), a transformer (3) so that said DC power source (1) supplies the primary power to the transformer (3) through the switching element (2). A rectifier and an output filter circuit are provided at the secondary side of the transformer (3). A parallel circuit with a capacitor (12) and a coil (13) is inserted in the primary current path, and a control circuit (14) controls the ON and/or OFF status of said switching element (2) so that the switching element (2) is turned to the ON status when the current in the coil (13) reaches a predetermined value which depends upon the output power of the present power converter, and said switching element (2) is turned to the OFF status after the current in said switching element (2) reaches zero. Since the current in the switching element is zero when the switching element is turned to the OFF status, no power loss occurs in the OFF transition, and thus, the conversion efficiency is improved.

7 Claims, 9 Drawing Figures

POWER CONVERTER

BACKGROUND OF THE INVENTION

The present invention relates to a power converter, which operates with high efficiency and low noise.

Since a switching type power converter has been proposed, the size of a power unit in an electronic apparatus has become smaller. However, due to the rapid progress of semiconductor technology, a power unit is requested to be smaller in size than that at present. Also, a power unit for an electronic apparatus is requested to operate with higher efficiency, and lower noise.

A prior power unit with a single transistor is shown in FIG. 1. In FIG. 1, the reference numeral 1 is a battery or a DC power source for providing the DC voltage $E_i$, 2 is a switching element implemented by a transistor, 3 is a transformer. The primary winding 3a of the transformer 3 and the switching element 2 are connected in a series, and are coupled with the battery 1. The numeral 3b is a secondary winding of the transformer 3, 4 and 5 are diodes for rectifying the output voltage across the secondary winding 3b. The numeral 6 is a choke coil, and the numeral 7 is a capacitor. The coil 6 and the capacitor 7 operate as an output filter circuit. The numeral 8 is a load coupled across the capacitor 7. The numeral 9 is an error voltage amplifier which monitors the output voltages across the load 8 and provides the error voltage which is the difference between the output voltage across the load and the predetermined reference voltage. The numeral 10 is a control circuit for controlling the switching operation of the transistor 2 (ON and OFF) according to the output of the error voltage amplifier 9. The control circuit 10 adjusts the ON duration, and/or the OFF duration of the transistor 2. The reference numeral 11 is a surge absorption circuit coupled across the primary winding 3a.

The power of the battery 1 is converted to an AC voltage by a switching transistor, and that AC voltage appears across the secondary winding 3b of the transformer 3. The output power of the transformer 3 is applied to the load 8 through the output filter circuit having the choke coil 6 and the capacitor 7. The output voltage across the load 8 is monitored by the error voltage amplifier 9, which controls the ON/OFF operation of the transistor 2 through the control circuit 10 so that the desired output voltage is obtained across the load 8. The surge absorption circuit 11 absorbs the surge voltage induced in the transformer 3 at the OFF transition of the transistor 2 to protect the transistor 2.

FIG. 2 and FIG. 3 show curves of the switching loss in a switching transistor, in which FIG. 2 shows the case of a slow switching operation, and FIG. 3 shows the case of a rapid switching operation. In FIGS. 2 and 3, the symbol V shows the voltage applied to the switching transistor 2, I is the current in the switching transistor 2, and P is the power in the switching transistor 2.

In FIG. 2 where the switching operation is slow, it is supposed that the switching transistor 2 is in the OFF status until the time $t_1$, said switching transistor 2 is turned to the ON status at the time $t_1$ and remains in the ON status during the time $t_1$ and $t_3$. The duration between the time $t_1$ and $t_2$ is the ON transition time. At the time $t_3$, the transistor 2 is turned to the OFF status, and the time during $t_3$ and $t_4$ is the OFF transition time from the ON status to the OFF status.

When the transistor 2 is turned to the ON status, the collector voltage V of the transistor 2 is reduced slowly according to the switching characteristics of the transistor 2 from the initial voltage $E_i$ of the battery voltage, and reaches zero (0) volt at the time $t_2$, on the condition that the transistor 2 is completely saturated. The current I in the transistor 2 increases slowly according to the switching characteristics of the transistor 2. Therefore, the power P which is the prouct of the voltage V and the current I, and is the loss in the transistor 2 during the ON transition between $t_1$ and $t_2$, is rather large. During the time $t_2$ and the time $t_3$, the transistor 2 remains in the ON status, the voltage V is zero, and the current I still increases due to the presence of the inductance of the choke coil 6. When the transistor 2 is turned to OFF at the time $t_3$, the current I reduces slowly according to the characteristics of the transistor 2, and reaches zero at the time $t_4$. In the OFF transition, a voltage is induced on the leakage inductance of the transformer 3, and then, the voltage V is the sum of the leakage voltage and the voltage $E_i$ of the battery 1, and therefore, the power loss P is considerably larger in the OFF transition between $t_3$ and $t_4$. After the time $t_4$, the current I remains zero, and the voltage V rises up to the clamp voltage $E_c$ because of the flyback voltage of the transformer, and then, the voltage V returns to the source voltage $E_i$ according to the decrease of said flyback voltage.

Next, in case of rapid switching operation as shown in FIG. 3, when the transistor 2 is turned to the ON status, the voltage V of the transistor 2 becomes zero quickly at the time $t_2'$, although the current I increases relatively slowly due to the primary leakage inductance of the transformer 3. Therefore, the power loss P in the ON transition between $t_1$ and $t_2'$ is very small. When the transistor 2 is turned to the OFF status at the time $t_3$, the voltage V increases to the clamp voltage $E_c$ rapidly because of the high leakage voltage which reflects the high decrease of the current I in the transistor 2. At that time, the current I decreases to zero until the time $t_4'$ relatively slowly, because the voltage V is restricted to the clamp voltage $E_c$ and the decrease rate of the current in the transistor 2 is small. Therefore, the power loss in the OFF transition between $t_3$ and $t_4'$ is still rather large.

As mentioned above, the power loss P in the switching transistor is consisted mainly of the OFF transition loss, which depends upon the leakage inductance of the transformer 3 and the clamp voltage $E_c$ of the surge absorption circuit 11. Therefore, the power loss P does not decrease even when a high speed switching transistor is used.

The large power loss in a switching transistor results in the generation of heat in an apparatus, and the temperature of an apparatus as a result becomes high. Therefore, the size of the apparatus of FIG. 1 cannot be small enough, because of the high operational temperature and the decrease of the operational reliability due to that high temperature.

SUMMARY OF THE INVENTION

It is an object, therefore, of the present invention to overcome the disadvantages and limitations of a prior power converter by providing a new and improved power converter.

It is also an object of the present invention to provide a new and improved power converter in which the power loss is small and the heat generation is also small.

The above and other objects are attained by a power converter comprising a DC power source (1), a switching element (2), a transformer (3) having a secondary winding (3b) and a primary winding (3a) coupled with said DC power source (1) and said switching element (2) so that said DC power source (1), the primary winding (3a) and the switching element (2) compose a closed circuit, a control circuit (14) for turning ON and OFF said switching element (2), a rectifier circuit with a diode coupled with the secondary winding of said transformer, and an output filter circuit coupled with said rectifier circuit, and the output of said output filter circuit being coupled with an external load. Said power converter further comprises of a parallel circuit with a capacitor (12) and a coil (13) inserted in said closed circuit, and said control circuit (14) being constructed so that said switching element (2) is turned to the ON status when the current in said coil (13) reaches a predetermined value which depends upon the output power of the present power converter, and said switching element (2) is turned to the OFF status after the current in said switching element (2) reaches zero.

The presence of the capacitor (12) and the coil (13) is the important feature of the present invention. Also, the manner of the control circuit (14) is another important feature of the present invention.

Preferably, the control circuit (14) has a current transformer for detecting the current in said coil (13) and the current in said switching element (2), and a level detector for detecting that said current reaches a predetermined threshold level.

According to the present invention, the power loss, in particular the power loss in an OFF transition, is considerably reduced because the current in the switching element is zero when that switching element is turned to the OFF status, and no leakage voltage appears on the transformer.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
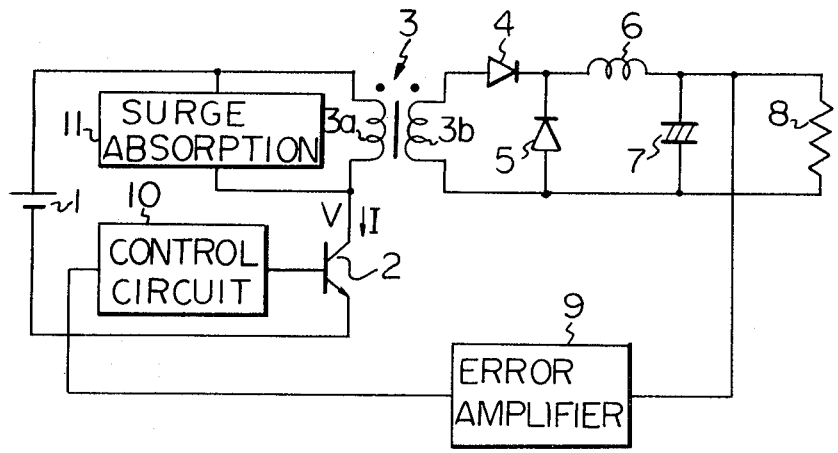
FIG. 1 is a circuit diagram of a prior power converter.
Figure 4:
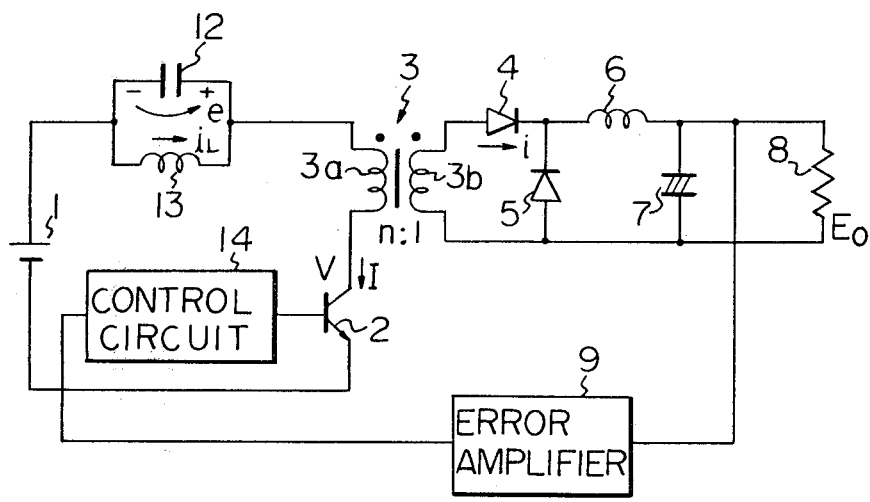
FIG. 4 is a circuit diagram of the present power converter.
Figure 2:
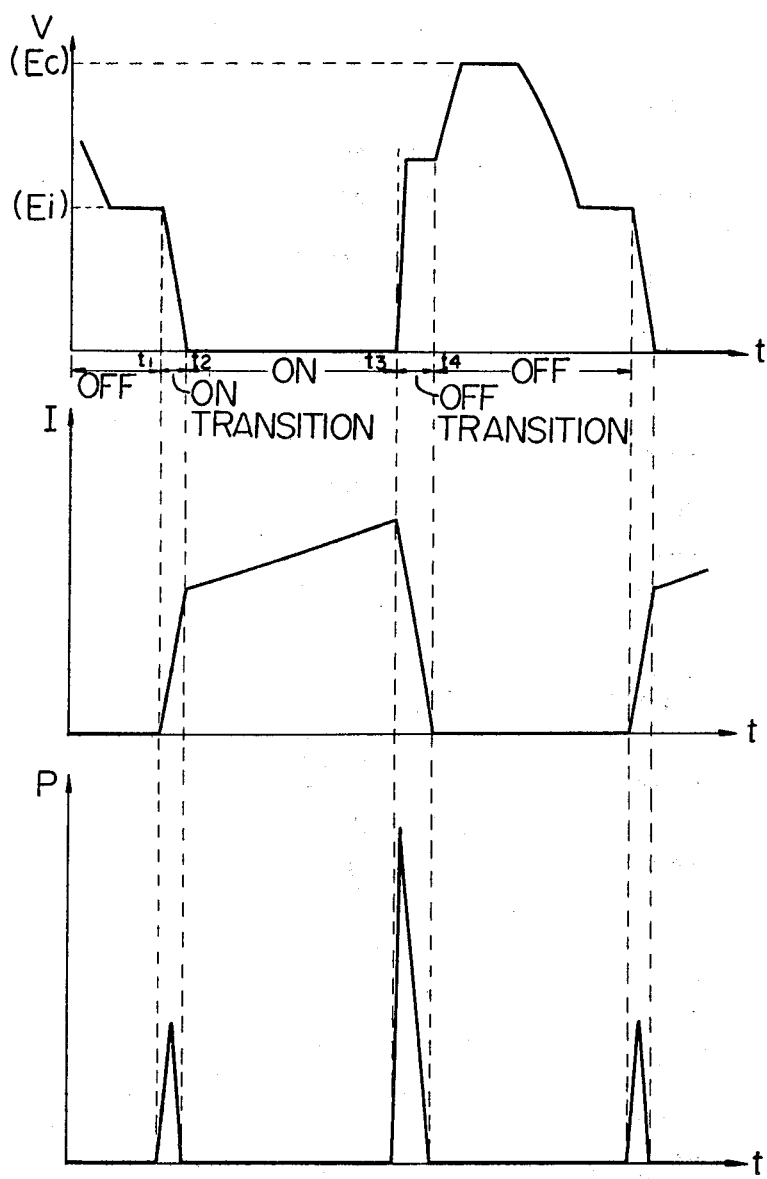
FIG. 2 shows the operational waveforms of the circuit of FIG. 1 when the operational speed of a transistor is slow.
Figure 3:
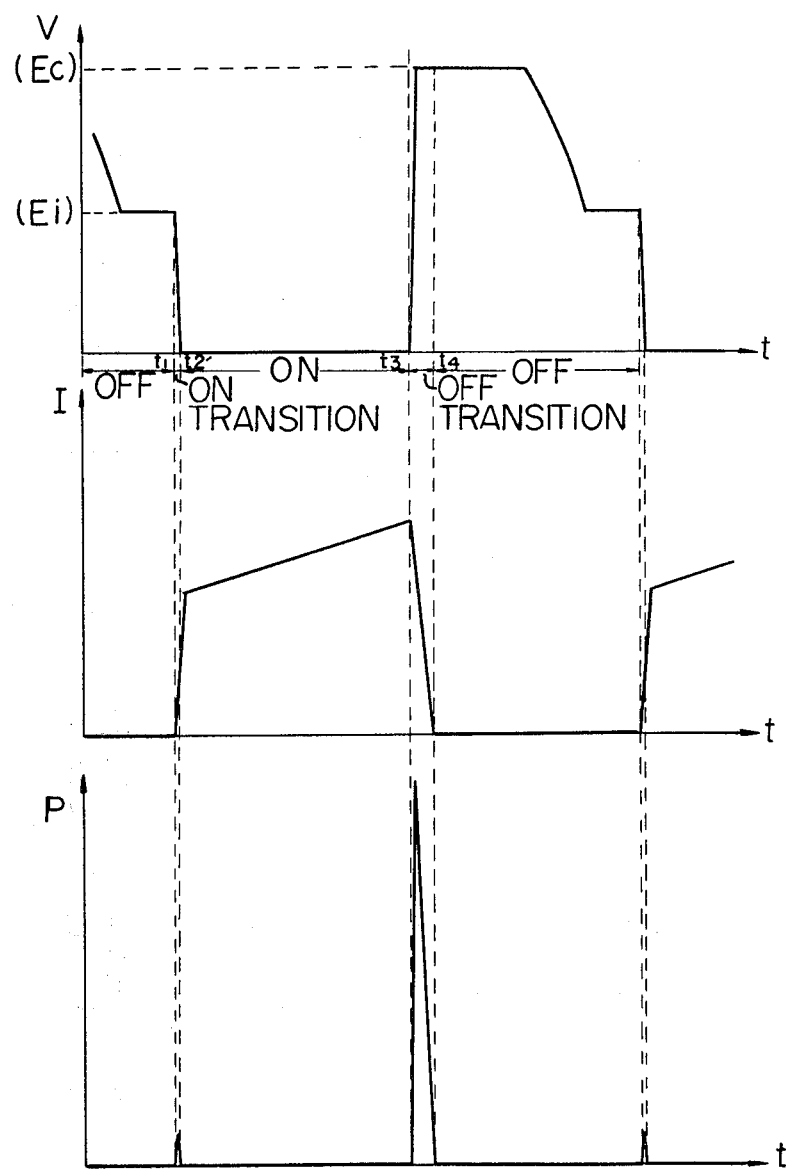
FIG. 3 shows the operational waveforms of the circuit of FIG. 1 when the operational speed of a transistor is high.

FIG. 4 shows a brief circuit diagram of the power converter according to the present invention, and has the same reference numerals as those of FIG. 1 for the same members. In FIG. 4, the reference numeral 1 is a battery or a DC power source, 2 is a switching element or a switching transistor, 3 is a transformer, 3a and 3b are a primary winding and a secondary winding of the transformer 3, respectively. The reference numerals 4 and 5 are diodes, 6 is a choke coil, 7 is a capacitor, 8 is a load, 9 is an error voltage amplifier, 12 is a capacitor, and 13 is a coil. The capacitor 12 and the coil 13 are connected parallel to each other, and the parallel circuit is inserted between the DC power source 1 and the primary winding 3a of the transformer 3. The reference numeral 14 is a control circuit which makes the switching element 2 the ON status when the current in the coil 13 reaches the predetermined value which depends upon the output power, and makes the switching element 2 the OFF status after the current in the switching element 2 reaches zero.

Figure 5:
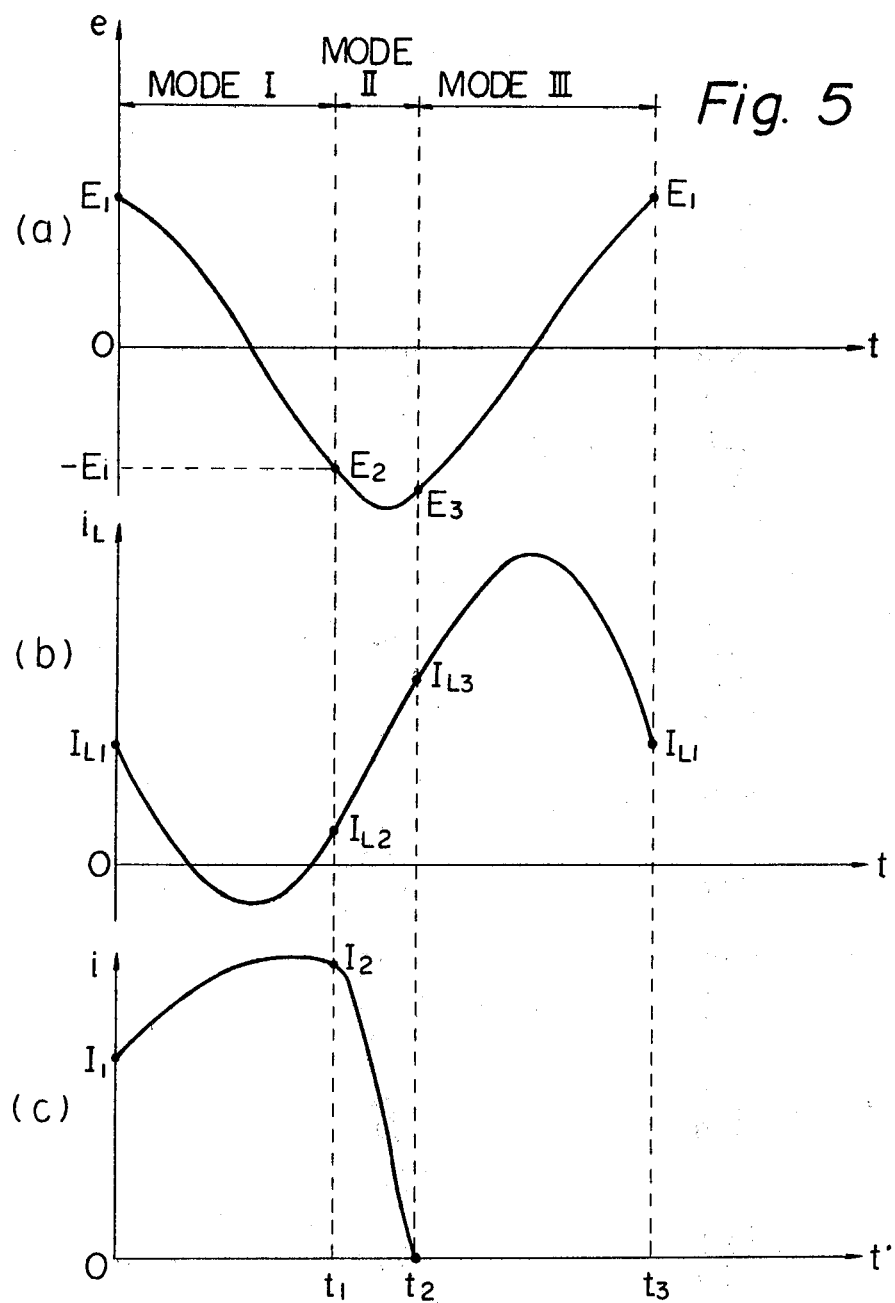
FIG. 5 shows the operational waveforms of the circuit of FIG. 4.

FIG. 5 shows the operational waveforms of the circuit of FIG. 4, and FIG. 5(a) shows the waveform of the voltage across the capacitor 12, FIG. 5(b) shows the waveform of the current in the coil 13, and FIG. 5(c) shows the waveform of the current in the diode 4. The polarity in FIGS. 5(a) and 5(b) coincides with the indication of FIG. 4.

When the switching element 2 switches to the ON status according to the output voltage of the control circuit 14, the primary winding 3a of the transformer 3 receives the voltage which is the sum of the voltage $E_i$ of the DC power source 1, and the voltage $E_1$ across the capacitor 12. Then, the voltage induced across the secondary winding 3b makes the diode 4 the ON status in the forward direction. Thus, the power in the DC power source 1 is applied to the load 8 through the capacitor 12 and the coil 13, the switching element 2 and the transformer 3, and at the same time, the choke coil 6 stores the energy. The capacitor 12 is discharged by the current from the DC power source 1 to the transformer 3, and further, in the next stage, that capacitor 12 is charged in the opposite polarity. When the charge voltage of the capacitor 12 reaches $-E_i$ the voltage across the primary winding 3a becomes zero, and the power supply from the DC power source 1 to the transformer 3 stops.

The operational mode I is confined to the duration from the ON switching of the switching element 2 to the time that the voltage across the primary winding 3a becomes zero. Then, the voltage e across the capacitor 12, the current $i_L$ in the coil 13, and the current i in the diode 4 are expressed by the equations (1a), (1b) and (1c), respectively, by solving the differential equations (1), (2) and (3).

$$L_0(di/dt) = (1/n)(e - E_i - V_{DSS} - L_2(d/dt)(i/n) - E_G) \quad (1)$$

$$-e = L_1(di_L/dt) \quad (2)$$

$$-e = (1/C) \int (i/n - i_L) \, dt \quad (3)$$

$$e = -A_1\sin(\omega_1 t + \theta_1) + (E_i/n + E_0)/(\omega_1^2 n L'_0 C) \quad (1a)$$

$$i_L = -(A_1/(\omega_1 L_1))\cos(\omega_1 t + \theta_1) + (1/(\omega_1^2 n C))(I_1/L_1 + \quad (1b)$$

$$I_{L1}/(nL'_0)) - (((E_i/n) + E_0)/(\omega_1^2 n L'_0 L_1 C)) \, t$$

-continued $$i = (A_1/(\omega_1 n L'_0)) \cos(\omega_1 t + \theta_1) + (1/(\omega_1{}^2 C))(I_1/L_1 + \quad (1c)$$
$$I_{L1}/(nL'_0)) - ((E_i/n + E_0)/(\omega_1{}^2 L'_0 L_1 C)) t$$

where $$A_1 = \sqrt{((-1/(\omega_1 C))(I_1/n - I_{L1}))^2 + (E_1 - ((E_i/n) + E_0)/(\omega_1{}^2 n L'_0 C))^2}$$

$$\theta_1 = \tan^{-1}((E_1 - ((E_i/n) + E_0)/(\omega_1{}^2 n L'_0 C))/((-1/\omega_1 C)(I_1/n - I_{L1})))$$

$$\omega_1 = \sqrt{(1/C)((1/(n^2 L'_0)) + 1/L_1)}$$

$$L'_0 = L_0 + L_2/n^2$$

In the above equations, the symbol t shows the time from the transition to the ON status of the switching element 2, $E_1$, $I_{L1}$ and $I_1$ are the initial values of e, $i_L$ and i, respectively, at the time t=0, and $E_0$ is the voltage across the capacitor 7 or the output voltage. Also, the symbol C is the capacitance of the capacitor 12, $L_0$ and $L_1$ are the inductance of the choke coil 6 and the coil 13, respectively, $L_2$ is the primary leakage inductance of the transformer 3, n is the winding ratio of the primary winding 3a to the secondary winding 3b. The $V_{DSS}$ is the saturation voltage between the collector and the emitter of the switching element, $E_G$ is the voltage drop in the resistance of the primary winding 3a, $V_F$ is the forward voltage drop in each diode 4 or 5, and $E_R$ is the voltage drop by the resistance in the secondary winding 3b. It is supposed in the above equations that the voltage drop ($V_{DSS}$, $V_F$) in the forward direction in the switching element 2 and the diode 4 is very small, and the resistances of the primary winding 3a and the secondary winding 3b of the transformer 3 are also very small, and also the relation $E_G = E_R = 0$ is satisfied.

The mode I finishes at the time $t_1$ when the relation $e = -E_i$ in the equation (1a) is satisfied, and at that time $t_1$ the value i is $I_2$ which is close to the maximum value as shown in FIG. 5(c). Since the primary voltage across the primary winding 3a is zero at the time $t_1$, the secondary voltage across the secondary winding 3b is also zero at that time $t_1$. Thus, the decrease of the value i increases the current in the diode 5, and therefore, the current in the choke coil 6 is kept constant. In other words, the change of the value i is defined by the primary circuit of the transformer 3, but does not depend upon the secondary circuit of the transformer 3.

Next, the mode II is defined as the duration from i=$I_2$ to i=0, and the values e, $i_L$ and i in the mode II are expressed by the equations (2a), (2b) and (2c) below by solving the differential equations (4), (5) and (6).

$$L_2(d/dt)(i/n) = e - E_i - V_{DSS} - E_G \quad (4)$$

$$-e = L_1(di_L/dt) \quad (5)$$

$$-e = (i/C) \int (i/n - i_L) dt \quad (6)$$

$$e = -A_2 \sin(\omega_2(t - t_1) + \theta_2) + E_i/(\omega_2{}^2 L_2 C) \quad (2a)$$

$$i_L = -(A_2/(\omega_2 L_1)) \cos(\omega_2(t - t_1) + \theta_2) + \quad (2b)$$
$$(1/(\omega_2{}^2 C))(I_2/(nL_1) + I_{L2}/L_2) - (E_i/(\omega_2{}^2 L_1 L_2 C))(t - t_1)$$

$$i = ((nA_2)/(\omega_2 L_2)) \cos(\omega_2(t - t_1) + \theta_2) + \quad (2c)$$
$$(n/(\omega_2{}^2 C))(I_2/(nL_1) + (I_{L2}/L_2)) - (nE_i/(\omega_2{}^2 L_1 L_2 C))(t - t_1)$$

where $$A_2 = \sqrt{((-1/(\omega_2 C))(I_2/n - I_{L2}))^2 + (E_2 - E_i/(\omega_2{}^2 L_2 C))^2}$$

$$\theta_2 = \tan^{-1}\{(E_2 - E_i/(\omega_2{}^2 L_2 C)) / ((-1/(\omega_2 C))(I_2/n - I_{L2}))\}$$

$$\omega_2 = \sqrt{(1/C)(1/L_1 + 1/L_2)}$$

In the above equations, the symbols $E_2$, $I_{L2}$ and $I_2$ are e, $i_L$ and i in the equations (1a), (1b) and (1c), respectively, at the time t=$t_1$. And, said values $E_2$, $I_{L2}$ and $I_2$ are the initial conditions in the mode II.

Since $\omega_2 > \omega_1$ is satisfied, the value i decreases rapidly in the mode II as shown in FIG. 5(c), and the current i reaches zero. The change of the current i in the diode 4 is the same as the change of the current in the switching element 2 on the time axis, although the absolute value of the former is different from the absolute value of the latter. Thus, if the control circuit 14 makes the switching element 2 the OFF status at the time t=$t_2$ in the equation (2c) by placing i=0 at the end of the mode II, the switching loss becomes zero.

The mode III is defined as the duration that the switching element is in the OFF status. Then, the values e, $i_L$ and i in the mode III are shown by the equations (3a), (3b) and (3c), which are obtained by solving the differential equations (7) and (8).

$$-e = L_1(di_L/dt) \quad (7)$$

$$e = (1/C) \int i_L\, dt \quad (8)$$

$$e = A_3 \sin(\omega_3(t - t_2) + \theta_3) \quad (3a)$$

$$i_L = (A_3/(\omega_3 L_1)) \cos(\omega_3(t - t_2) + \theta_3) \quad (3b)$$

$$i = 0 \quad (3c)$$

where $$A_3 = \sqrt{(I_{L3}/(\omega_3 C))^2 + E_3{}^2}$$

$$\theta_3 = \tan^{-1}(E_3/(I_{L3}/(\omega_3 C)))$$

$$\omega_3 = 1/\sqrt{L_1 C}$$

In the equations (3a), (3b) and (3c), the values $E_3$ and $I_{L3}$ are initial conditions of the mode III and are obtained by the values i and $i_L$ in the equations (2a) and (2b) respectively, at the time t=$t_2$.

The operational mode returns to the mode I again when the control circuit 14 turns the switching element 2 to the ON status at the time t=$t_3$ when e=$E_1$ and $i_L = I_{L1}$ in the equations (3a) and (3b) are satisfied. And, those operational modes I, II and III repeat.

As mentioned above, the present invention decreases the power loss in the switching transient in the switching element 2. In particular, the power loss in the OFF transient is reduced, since the switching element is turned to the OFF status after the current in the same becomes zero. In order to provide the satisfactory decrease of the power loss in the OFF transition, the control circuit 14 must provide the proper initial conditions to the circuit elements.

Figure 6:
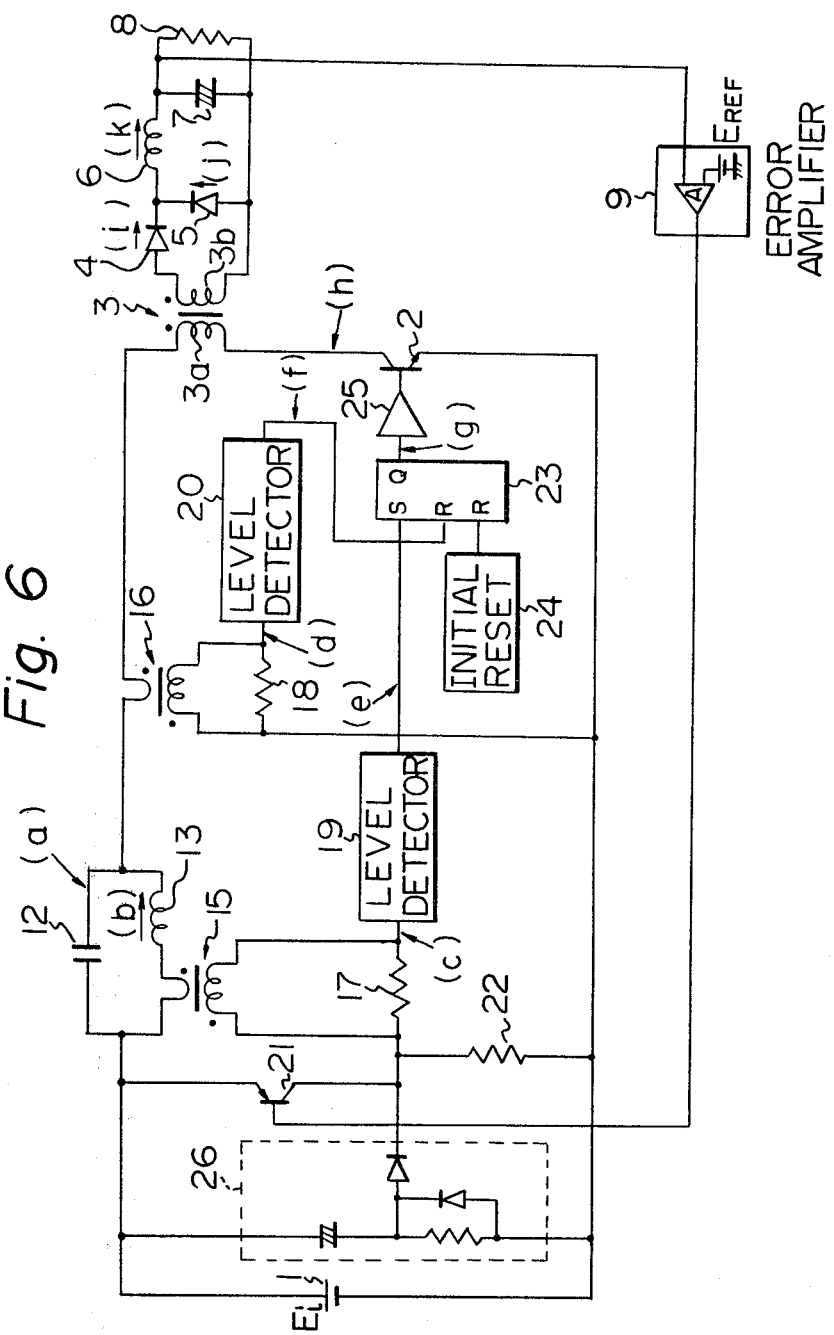
FIG. 6 shows another circuit diagram of the power converter according to the present invention.

FIG. 6 shows the detailed circuit diagram of the power converter according to the present invention. In the figure, the reference numerals 15 and 16 are current transformers for detecting the current in the coil 13, and the primary winding 3a of the transformer 3, respectively. The reference numerals 17 and 18 are resistors terminating said current transformers 17 and 18, respectively. The reference numerals 19 and 20 are level detectors which provide a narrow output pulse when the input voltage of the same crosses the predetermined threshold level in the negative direction. The numeral 21 is a transistor the collector current of which is controlled by the error voltage amplifier 9. The error voltage amplifier has the comparator A and the reference voltage source ($E_{REF}$) to provide the difference between the reference voltage $E_{REF}$ and the output voltage across the load 8. The numeral 22 is a resistor, 23 is a flip-flop which is turned to the set status by the output pulse of the level detector 19, and is turned to the reset status by the output pulse of the other level detector 20. The reference numeral 24 is an initial reset circuit, 25 is a power amplifier for switching ON and OFF the switching element 2, 26 is an initial start circuit having a capacitor, a resistor and two diodes. Other elements in FIG. 6 are the same as the corresponding elements in FIG. 4.

Figure 7:
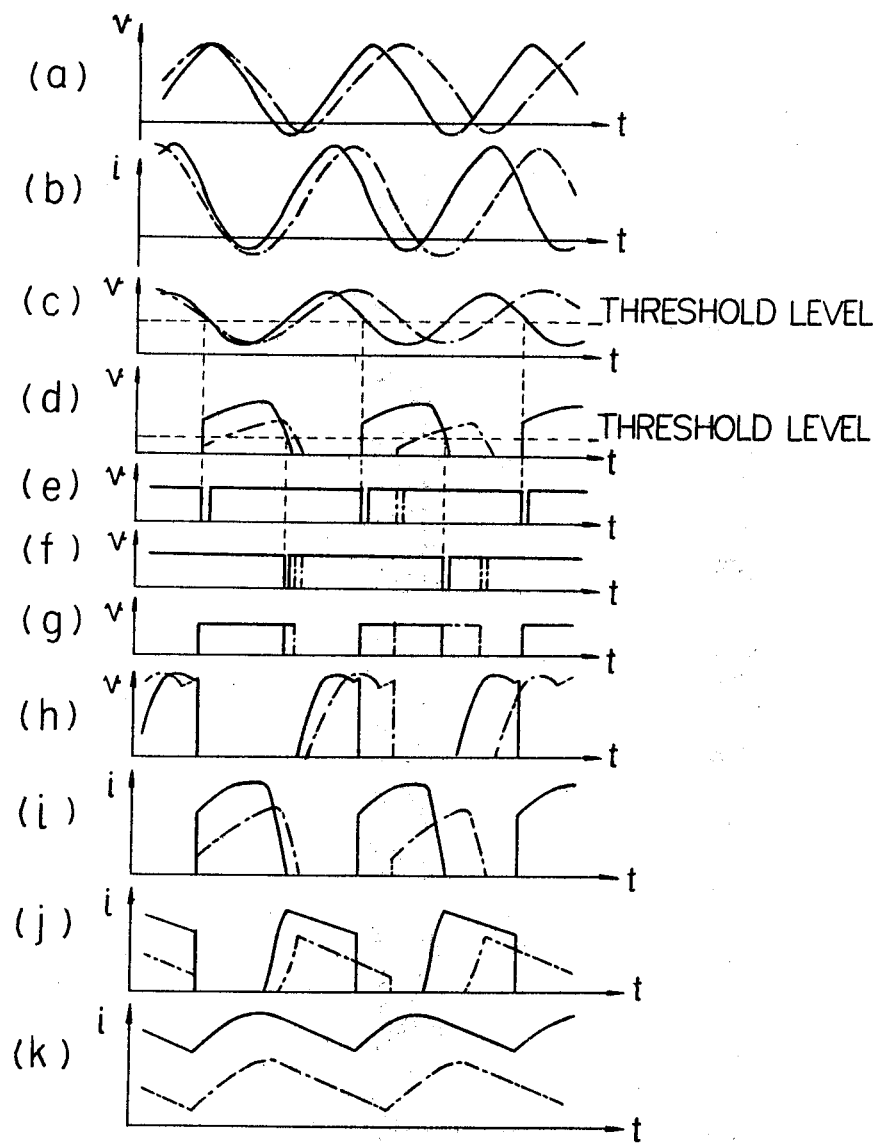
FIG. 7 shows the operational waveforms of the circuit of FIG. 6.

FIG. 7 shows the operational waveforms of the circuit of FIG. 6. In the figure, the curve (a) shows the voltage across the capacitor 12, the curve (b) shows the current in the coil 13, (c) and (d) show the voltages across the termination resistors 17 and 18, respectively. The curves (e) and (f) show the output voltages across the level detectors 19 and 20, respectively. The curve (g) shows the output voltage of the flip-flop 23, the curve (h) shows the voltage applied to the collector of the switching element 2, the curves (i) and (j) are the curves of the current in the diodes 4 and 5, respectively. And, the curve (k) shows the current in the choke coil 6. In those curves, the solid line shows the case that the power consumed in the load 8 is large, and the dotted line shows the case that the power consumed in the load 8 is small.

Now, the operation is described. When the DC power source 1 is coupled with the circuit, the flip-flop 23 is in the reset status, and the switching element is in the OFF status, by the operation of the initial reset circuit 24. As the capacitor in the initial start circuit 26 is charged, the voltage across the resistor 22 decreases, and when that voltage reaches the predetermined threshold level, the level detector 19 provides the output pulse which sets the flip-flop 23 to the set status, and makes the switching element 2 to the ON status through the power amplifier 25. Thus, the present circuit is started.

As the capacitor 12 is charged, the current in the primary winding 3a of the transformer 3 decreases, and the voltage (see FIG. 7(d)) across the termination resistor 18 decreases. When said voltage (see FIG. 7(d)) across the resistor 18 reaches the predetermined level, the level detector 20 provides the output pulse (see FIG. 7(f)), which is applied to the flip-flop 23. Thus, the flip-flop 23 is turned to the OFF status (see FIG. 7(g)), and then, the switching element 2 is also turned to the OFF status. Next, the capacitor 12 is charged in the opposite direction by the current (see FIG. 7(b)) in the coil 13. At that time, the current in the coil 13 is decreasing (see FIG. 7(b)), and the termination resistor 17 provides the voltage (see FIG. 7(c)) corresponding to the current of FIG. 7(b) through the current transformer 15. Said voltage across the resistor 17 is applied to the level detector 19, and therefore, when the voltage of FIG. 7(c) reaches the predetermined threshold level, said level detector 19 provides the output pulse (see FIG. 7(e)), again, and then, the flip-flop 23 is turned to the ON status and the switching element 2 is turned to the ON status. By repeating the above operation, the switching element 2 performs the ON/OFF operation.

The power applied to the load 8 can be adjusted by adjusting the voltage across the resistor 22 through the transistor 21. When the power requested by the load 8 increases, the error voltage amplifier 9 decreases the collector current of the transistor 21, and decreases the voltage across the resistor 22, then, the flip-flop 23 and the switching element 2 are turned to the ON status at an early timing to increase the power. On the contrary, when the power requested by the load 8 decreases, the collector current of the transistor 21 is increased to rise the voltage across the resistor 22. Then, the switching timing of the flip-flop 23 and the switching element 2 is delayed and the secondary power delivered to the load is decreased. Thus, according to the present invention, the output power and/or the initial operational condition are adjusted by controlling the operational frequency.

According to the preferred embodiment, the level detectors 19 and 20 are implemented by the integrated circuit MC-14584 manufactured by Motorola Co. in USA, and the error amplifier 9 is implemented by the integrated circuit μA-723 manufactured by Fairchild Co. in USA. The operational frequency is 80–130 kHz depending upon the load, the value of the capacitor 12 is 0.2 μF, the value of the inductance 13 is 15 μH, the value of the choke coil 6 is 6 μF. And, the primary voltage $E_i$ is 48 volts for the use of the present power converter for an electronic telephone exchange system. In an actual design of the capacitor 12 and the inductance 13, the values of those elements are designed according to the desired operational frequency.

Figure 8:
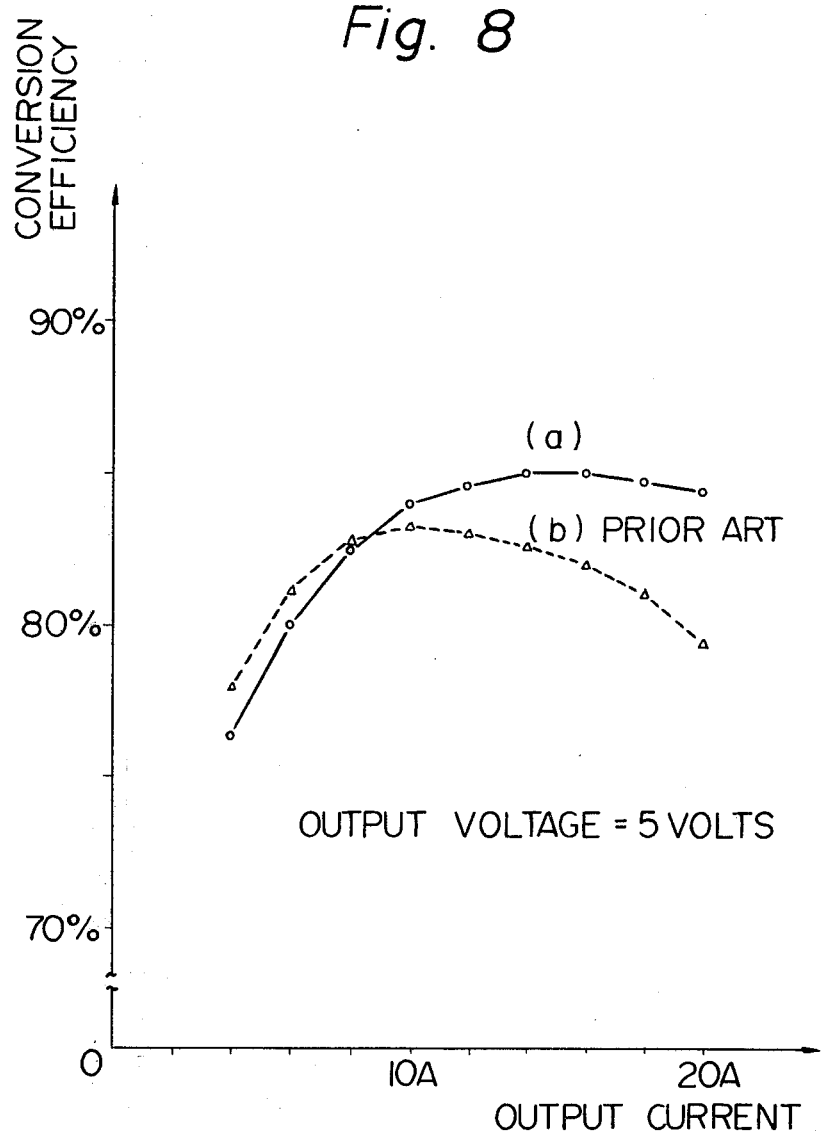
FIG. 8 shows a curve showing the characteristics of the present power converter.
Figure 9:
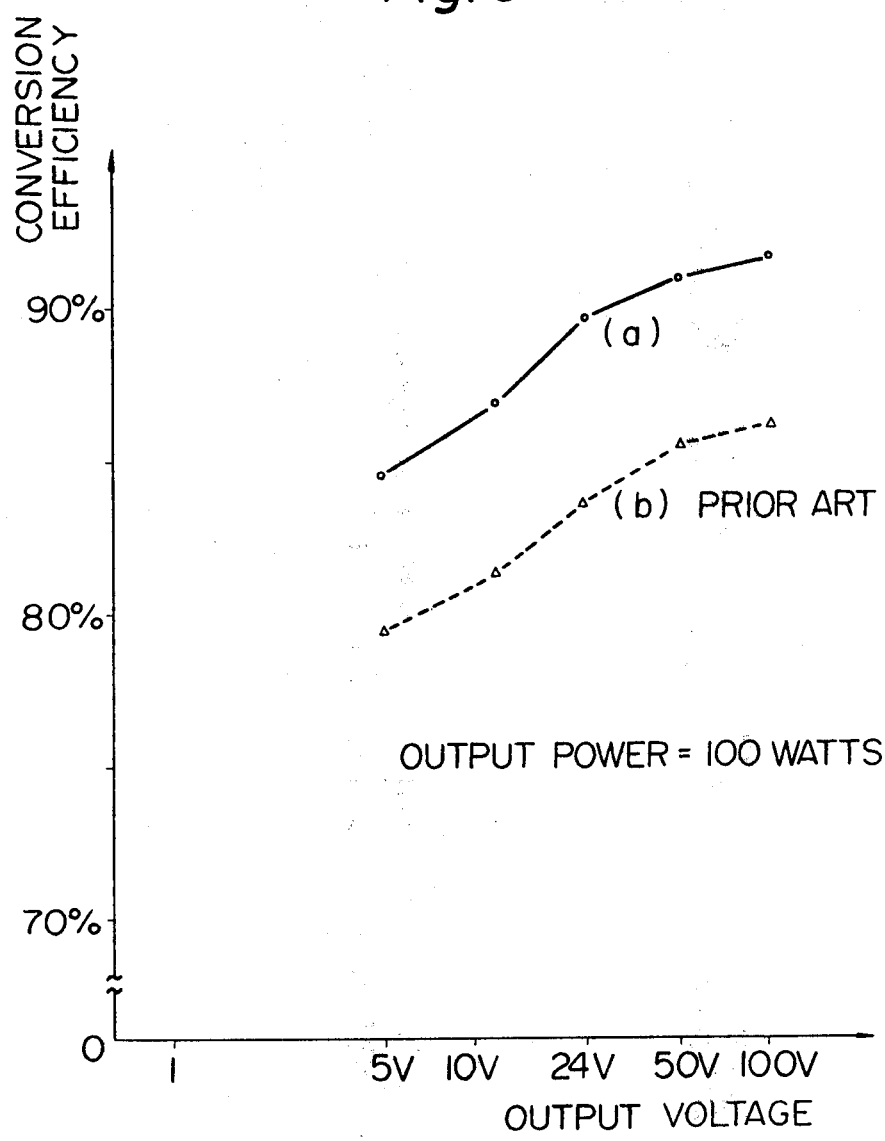
FIG. 9 shows a curve showing the characteristics of the present power converter.

FIG. 8 and FIG. 9 show the curves showing the conversion efficiency of the present invention together with that of the prior art. In those figures, the solid line (a) shows the curve of the present invention, and the dotted line (b) shows the curve of the prior art. In FIG. 8, the horizontal axis shows the output current, and the vertical axis shows the conversion efficiency, and the output voltage is kept 5 volts in FIG. 8. In FIG. 9, the horizontal axis shows the output voltage, the vertical axis shows the conversion efficiency, and the output power is kept at 100 watts.

As apparent from FIGS. 8 and 9, the conversion efficiency of the present invention is better than that of the prior power converter. It will be noted in FIGS. 8 and 9 that the conversion efficiency up to 90% is obtained. The remaining power loss of about 10% comes from the loss in the forward voltage drop in the diodes 4 and 5.

As apparent from the above explanation, the parallel circuit with the capacitor and the coil make the current in the switching element zero before that switching element switches to the OFF status, and then, the switching element is turned to the OFF status and the source voltage or the collector voltage is applied to the switching element. Therefore, the switching loss in the OFF transient of the switching element is almost eliminated. Thus, a power converter with excellent conversion efficiency is obtained. Further, due to the small conversion loss, the heat generation in an apparatus is also decreased, and thus, the size of an apparatus can be smaller. Further, although a prior power converter generates an undesired noise in the OFF transient due to the rapid change of the voltage and the current, the present power converter generates almost no noise because the collector voltage of the switching element increases slowly after the current in the switching element becomes zero in the OFF transient.

Therefore, the present power converter is suitable as a power source of a digital processing device which might suffer from the noise from the power supply.

From the foregoing it will now be apparent that a new and improved power converter has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A power converter comprising a DC power source (1), a switching element (2), a transformer (3) having a secondary winding (3b) and a primary winding (3a) coupled with said DC power source (1) and said switching element (2) so that said DC power source (1), the primary winding (3a) and the switching element (2) compose a closed circuit, a control circuit (14) for turning ON and OFF said switching element (2), a rectifier circuit with a diode coupled with the secondary winding of said transformer, and an output filter circuit coupled with said rectifier circuit, and the output of said output filter circuit being coupled with an external load, characterized in that a parallel circuit with a capacitor (12) and a coil (13) is provided in said closed circuit, and said control circuit (14) controls said switching element (2) so that said switching element (2) is turned to the ON status when the current in said coil (13) reaches a predetermined value which depends upon an output power of the present power converter, and said switching element (2) is turned to the OFF status after the current in said switching element (2) reaches zero.

2. A power converter according to claim 1, wherein said control circuit (14) has a current transformer (15) and a resistor (17) for detecting the current in said coil (13), a first level detector (19) for detecting that the current in the coil (13) reaches a predetermined value depending upon the output power, a second current transformer (16) and a resistor (18) for detecting the current in the switching element (2), and a second level detector (20) for detecting when the current in the switching element (2) reaches zero.

3. A power converter according to claim 2, wherein a flip-flop circuit (23) is provided for turning ON and OFF said switching element (2), and said flip-flop (23) is turned to the ON status by the output of said first level detector (19) and is turned to the OFF status by the output of said second level detector (20).

4. A power converter according to claim 1, wherein said rectifier circuit has a pair of diodes (4, 5), one end of the first diode (4) is connected to one end of the secondary winding (3b), the second diode (5) is connected to the other end of the first diode (4) and the other end of the secondary winding (3b).

5. A power converter according to claim 1, wherein said output filter circuit has a choke coil (6) and a capacitor (7).

6. A power converter according to claim 1, further comprising an error voltage amplifier for adjusting the switching timing of said switching element (2) according to the power requested of the load.

7. A power converter according to claim 3, wherein a power amplifier (25) is provided between the output of said flip-flop circuit (23) and the input of said switching element (2).

* * * * *